United States Patent [19]

Scully

[11] 4,358,134
[45] Nov. 9, 1982

[54] TRAILER FRAME BEAM

[75] Inventor: Andrew J. Scully, Macomb County, Mich.

[73] Assignee: The United States of America as represented by the Secretary of the Army, Washington, D.C.

[21] Appl. No.: 200,297

[22] Filed: Oct. 24, 1980

[51] Int. Cl.³ ............................................. B62D 53/06
[52] U.S. Cl. .................................. 280/676; 280/686; 280/789; 280/799
[58] Field of Search ............... 280/789, 799, 676, 677, 280/682, 683, 684, 686

[56] References Cited

U.S. PATENT DOCUMENTS

| | | | |
|---|---|---|---|
| 3,300,839 | 1/1967 | Lichti | 280/799 |
| 3,705,732 | 12/1972 | Marinelli | 280/799 |
| 3,921,999 | 11/1975 | Masser | 280/676 |
| 4,147,379 | 4/1979 | Winslow | 280/799 |

Primary Examiner—Joseph F. Peters, Jr.
Assistant Examiner—John A. Carroll
Attorney, Agent, or Firm—Peter A. Taucher; John E. Becker; Nathan Edelberg

[57] ABSTRACT

An improved I beam construction for longitudinal I beams preferably as used in trailer frames. The I beam is comprised of a top flange, a bottom flange, a vertical web wall interconnecting the top and bottom flanges along their centerlines in a customary manner, for a substantial part of its length, with the novel aspect including a portion of the vertical web wall offset laterally toward the outer side edges of the top and bottom flanges so that said offset wall portion is essentially flush with those said edges. The purpose of this offsetting is to provide more advantageous horizontal and vertical mounting surfaces for saddle mount capability and attachment of a trailer's wheel suspension assembly, which construction is found to be stronger than can otherwise be fabricated.

2 Claims, 6 Drawing Figures

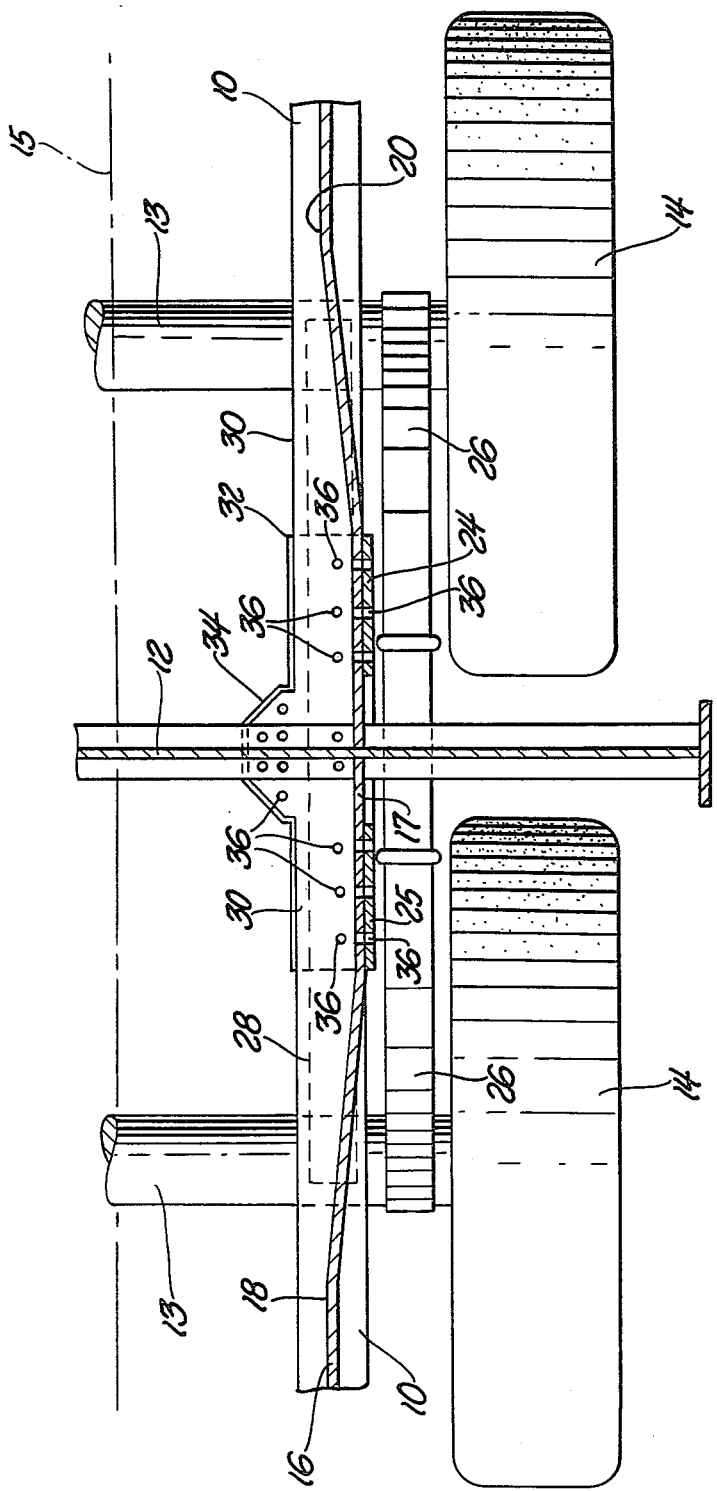

TRAILER FRAME BEAM

DEDICATORY CLAUSE

The invention described herein may be manufactured, used and licensed by or for the Government for governmental purposes without payment to me of any royalty thereon.

BACKGROUND AND SUMMARY OF THE INVENTION

This invention relates to a novel I beam construction for use especially in fabricating trailer frames, and more particularly the longitudinal beams that provide major stiffness parallel to the trailer centerline. The new feature contributed by this invention is a means whereby improved attachment of the longitudinal I beams to the wheel suspension assembly can be made with a minimum of welding, no loss of structural strength, and without the necessity of construction of additional fixtures to secure the I beam to the wheel suspension assembly. This is accomplished by by an outward offset imparted to each I beam's vertical web wall in the area between the tandem axles of the trailer. This is advantageous in that it provides a direct mounting connection between the I beam and the customary complementary vertical flange on the suspension saddle bracket means. Thus, the high strength-low weight features of the I beam are utilized without sacrificing suspension saddle mount capability and without the necessity of fabricating additional mounting structures or areas onto the I beam.

The novel offset in the I beam is preferably formed by the bending of the intermediate web wall before it is welded to the beam's top and bottom flanges. In this manner, improved means for facilitating the direct connection between the saddle and the I beam is created. This is advantageous in that with this type of connection, in which there both vertical and horizontal mounting surfaces are required, a much stronger beam and saddle attachment assembly is achieved than can be obtained with other fabricated connections. Furthermore, the stated offsetting allows additional bolts to be used and with a greater degree of accessability thereto to secure the I beam to the wheel suspension system.

Accordingly, it is the primary objective of this invention to provide a direct connection between the longitudinal I beams and the wheel suspension assembly without the necessity of constructing additional structures with which to join the two together.

THE DRAWINGS

FIG. 3 is an enlarged horizontal cross-sectional view of the rear portion of the trailer taken essentially on line 3—3 of FIG. 5, and oriented parallel to trailer centerline depicting my invention and showing a series of matched bolt openings;

DETAILED DESCRIPTION OF A PREFERRED MODE

Figure 1:
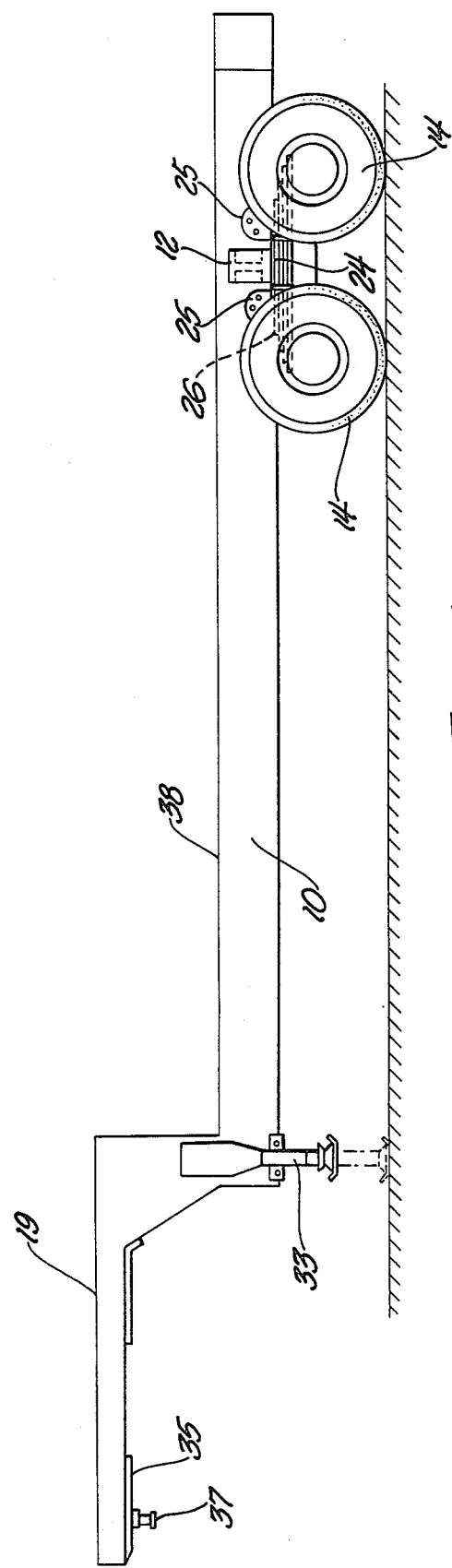
FIG. 1 depicts a side elevation of a trailer embodying my invention.

In the drawings, there is shown in FIG. 1 a side elevation of a trailer assembly embodying my invention. The trailer assembly includes a goose neck portion 19 that carries both a suitable king pin 37 and skid plate 35. The load-carrying portion of the trailer comprises a platform 38 that includes two longitudinal I beams 10, which collectively provide stiffness and rigidity parallel to the trailer centerline, together with transverse beams 11 and 12. Attached to the trailer platform is a wheel suspension system comprised of a saddle mount bracket 24 and leaf spring mechanism 26. This is better seen in FIGS. 5 and 6. The suspension assembly is attached to the tandem wheel axles which carry tandem wheels 14.

Figure 2:
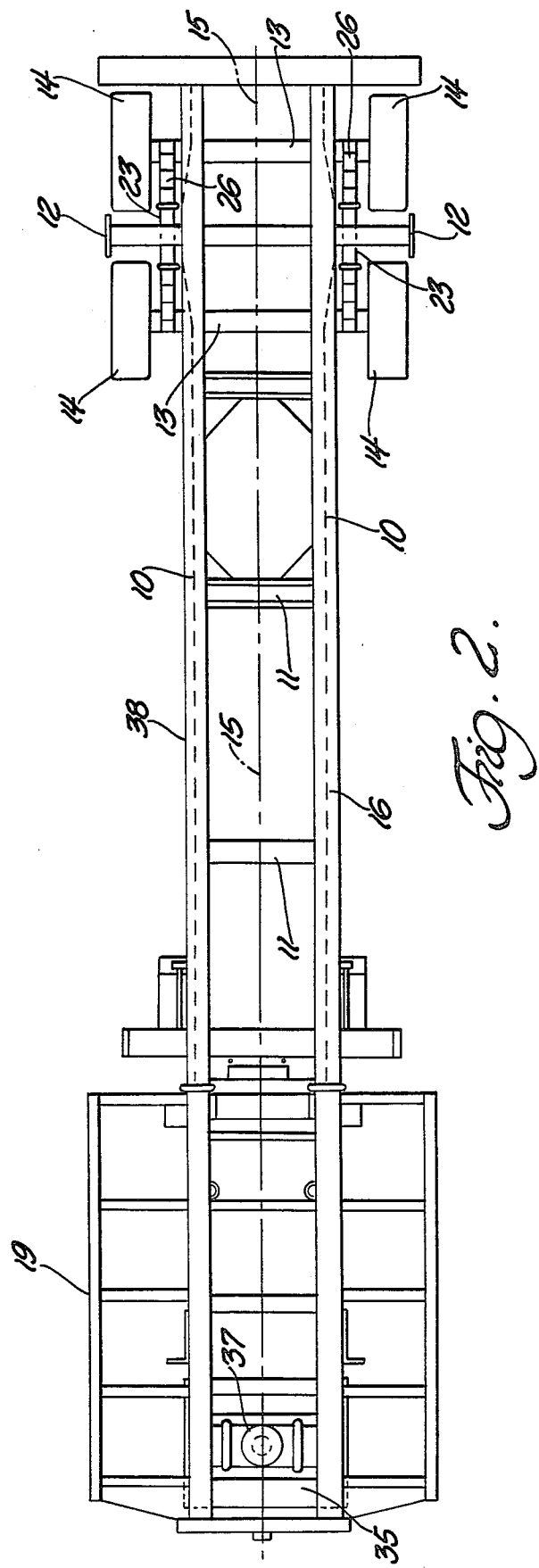
FIG. 2 depicts a top plan view of the FIG. 1 trailer showing its construction.
Figure 4:
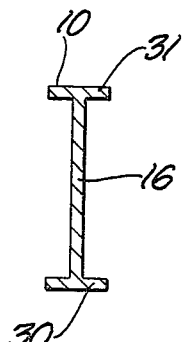
FIG. 4 depicts a transverse section of one of the longitudinal I beams.

FIG. 2 depicts a top plan view of the FIG. 1 trailer showing its construction. Note that the trailer is composed of goose neck portion 19 and trailer platform 38. Trailer platform 38 is comprised of two longitudinal I beams 10 which are parallel to the trailer centerline 15. Vertical web wall 16 of the longitudinal I beam 10 are, for the most part, centered between the top and bottom flanges. This construction is better seen in FIG. 4 which depicts a transverse section of longitudinal I beam 10. Longitudinal I beam 10 is comprised of a top flange 31, a bottom flange 30 and the vertical web wall 16 which, as stated earlier, is for the greater part of its length, centered on the two aforementioned flanges. The web wall is offset toward the outer edge of I beam 10 in the vicinity of the wheel suspension assembly. In this manner, the offsetting provides a horizontal and vertical mounting face for securing the I beam to the wheel suspension assembly. Note that the manufacture of the I beam will vary according to the materials used. Usually, I beams of this sort are formed by a rolling process whereby the flange and web wall are manufactured as a single unit. The drawback to this process is that softer steels must be used in the rolling process. However, if the requirements of the vehicle are such that a softer metal can be used, an entire I beam may be rolled out and the offset portion could be added after by removing the portion of the web wall where the offset is desired and welding the offset portion in its place. The advantage which such a process would entail is the elimination of welding the entire length of the web wall.

There are applications where the I beams are required to be made of very hard steels, or a combination of hard and soft steels. If such is the case, the rolling process would prove unavailable because such a process would produce unacceptible wear on the I beam producing machinery. In such cases, the I beam would be formed by separately manufacturing the top and bottom flanges and the web wall with its offset portion as desired, and then welding these components together to form the required I beam. The advantage to be gained by this approach is the greater structural strength which would be derived by using harder steels or a combination of hard and soft steels rather than using entirely soft steels for the construction of the I beam. The disadvantage to this approach is the time and cost factor of assembling and welding these components together. These factors are both controlled however by the requirements of the trailer. The longitudinal I beams 10 are interconnected transversely by means of transverse beams 11 and 12. The number of transverse beams 11 varies with the length and needs of the trailer. FIG. 3 is an enlarged horizontal cross-sectional view of the rear portion of the trailer oriented parallel to the trailer centerline 15. Note that a similar beam and attending appurtenances would be located on the other side of the trailer centerline.

Transverse beam 12 is located between the tandem axles 13, 13 and is designed to be inserted through I beam 10. To accomplish this, a single cut is to be made in web wall 16. It should be noted that beam 12 is intended to overlie the bottom flange 30 of I beam 10. The purpose of this is to provide support for I beam 10 as well as to offer additional area of attachment for the I beam 10, and the wheel suspension assembly 23.

Longitudinal I beam 10 may be equipped with an extension 34 (FIGS. 3 and 6) which is positioned to underlie transverse beam 12. Web wall 16, which as previously stated is centered on the I beam in the longitudinal direction and runs parallel to the trailer centerline for the greater part of its length, is laterally offset between points 18 and 20. This laterally offset portion 17 on I beam web wall 16 is offset outboard from the centerline, and is substantially flush with the outboard edge of the I beam's top and bottom flanges. The offsetting of portion 17 allows outboard face 22 of portion 17 to be in direct facial contact with vertical flange 25 of beam saddle 24 and creates a vertical mounting surface for affixing I beam 10 to wheel suspension assembly 23. The under surface of lower flange 30 of I beam 10 preferably rests directly or indirectly upon horizontal wall 32 of saddle bracket 24, thus proving a horizontal mounting surface for I beam 10. For the indirect resting situation, a reinforcement plate 28 may be interposed between flange 30 and horizontal wall 32 for local reinforcement of the beam. The reinforcement plate 28 should be approximately as long as the offset portion of web wall 16. This entire arrangement may be viewed in transverse section in FIG. 6 and FIG. 3. As best seen in FIG. 3, flange 30, reinforcement plate 28, horizontal wall 32 and extension 34 may be provided with a series of matched openings 36 to receive bolts or rivets (not shown) to affix the aforementioned parts together. It will be noted from FIG. 3 that the offset wall portion of each I beam web wall includes a straight wall portion 17 having its outer surface flush with the outboard edges of the beam top and bottom flanges, a first connector wall portion extending forwardly from wall portion 7 at an acute angle to the beam centerline to a connection at 18 with the main portion of the beam web wall, and a second connector wall portion extending rearwardly from wall portion 17 at an acute angle to the beam centerline to a connection at 20 with the main portion of the beam web wall. The combined length of straight wall portion 17 and the two acutely angled connector wall portions is the distance between points 18 and 20. As seen in FIG. 3, this is approximately the same as the centerline spacing of the tandem axles 13. Wall portion 17 is slightly longer than each angled connector wall portion to enable wall portions 17 and 30 to have extensive surface area contact with saddle walls 25 and 32. The saddle bracket and support walls are relatively large to accommodate large numbers of connector bolts or rivets.

Figure 5:
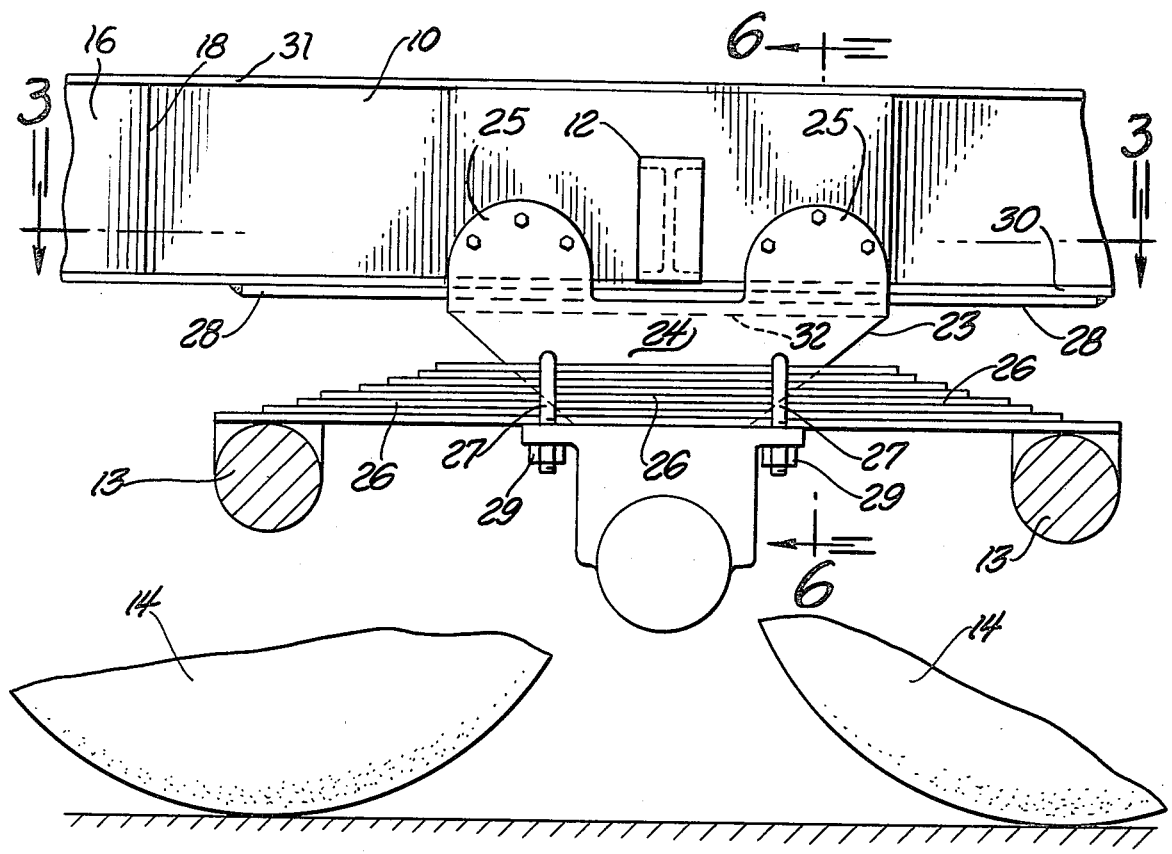
FIG. 5 depicts an enlarged side elevation of the rear portion of the trailer in FIG. 1 showing the manner of attachment to the wheel suspension assembly.
Figure 6:
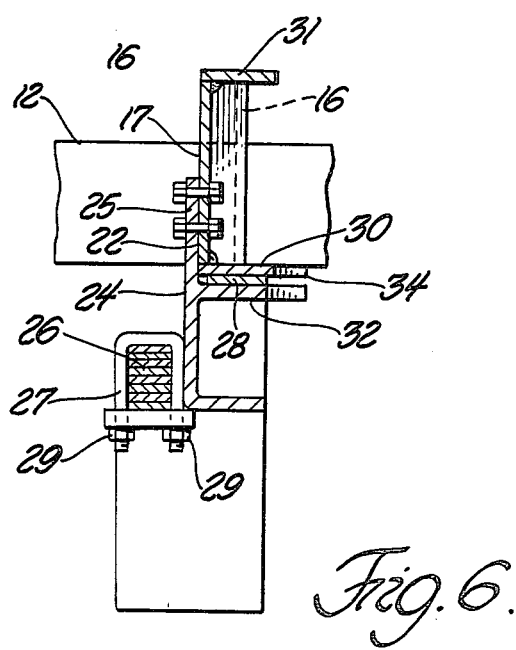
FIG. 6 depicts a transverse vertical cross-section of the rear portion of the trailer in FIG. 1 viewed substantially on line 6—6 of FIG. 5, showing my invention.

FIG. 5 is an enlarged side view of the rear portion of the trailer depicting wheel suspension assembly 23 comprised of leaf spring mechanism 26, which is secured by U bolts 27 and nuts 29 to saddle bracket 24, said saddle bracket including vertical flanges 25 and horizontal wall 32. Referring to FIG. 6, vertical flanges 25 and horizontal wall 32, plus reinforcement plate 28, collectively provide vertical and horizontal mounting surfaces for I beam 10. Notice that offset portion 17 and vertical flange 25 may be equipped with matched openings to secure them together. Horizontal wall 32 and bottom flange 30 may also be similarly equipped. The optional reinforcement plate 28 may be inserted between horizontal wall 32 and bottom flange 30 to provide additional strength to the longitudinal I beam. The aforementioned reinforcement plate may vary in length, according to the dictates of need. Note that plate 28 may also be equipped with matched openings to secure all the aforementioned members together.

As seen in FIG. 3, the offsetting of portion 17 of web wall 16 provides an extra margin of clearance space for rivets or bolts in that the offset portion allows accommodation for a large number of bolts or rivets which may be used to secure the I beam to the wheel suspension assembly. In this manner, attachment may be made without any substantial increase in the overall weight of the trailer.

I wish it to be understood that I do not desire to be limited to the exact details of construction shown and described for obvious modifications will occur to a person skilled in the art.

I claim:

1. In a tandem wheel trailer having a frame that includes a pair of longitudinal I beams spaced outboard from the trailer longitudinal centerline, said longitudinal I beams having their web walls arranged vertically to provide the trailer frame with its longitudinal stiffness and rigidity; and transverse beams extending between the longitudinal I beams at spaced intervals therealong to give the trailer frame its stiffness and rigidity in the transverse direction; a tandem wheel suspension assembly supportably engaging the I beams near their rear ends; said suspension assembly including two longitudinally spaced axles for the trailer wheels and a spring mechanism providing a resilient interconnection between the axles and each trailer frame I beam: the improvement wherein each longitudinal I beam comprises a top flange (31), a bottom flange (30) and an interconnecting web wall (16); each web wall being located in a vertical plane approximately midway between the edges of the top and bottom flanges except for a rearward portion of said web wall located between the aforesaid tandem axles; said rearward portion of each web wall including an elongated straight wall portion (17) having its outer surface flush with the outboard edges of the beam top and bottom flanges, a first connector wall portion extending forwardly from said straight wall portion (17) at an acute angle to the beam longitudinal centerline, and a second connector wall portion extending rearwardly from said straight wall portion (17) at an acute angle to the beam longitudinal centerline; the combined length of said straight flush wall portion (17) and the two acutely angled connector wall portions being approximately the same as the centerline spacing of the tandem axles; the straight flush wall portion (17) being located approximately midway between the tandem axles; said straight flush wall portion (17) being slightly longer than each angled connector wall portion; said suspension assembly comprising a saddle bracket operatively engaged with each I beam; each saddle bracket including an upstanding wall (25) having direct surface area engagement with said straight flush wall portion (17) of the I beam, and a horizontal wall (32) underlying the bottom flange of the I beam; said bracket being approximately the same length as said straight flush wall portion (17); first connectors extending through each bracket upstanding wall (25) and straight flush wall portion of the associated I beam; and second connectors extending through each bracket horizontal wall (32) and bottom flange of the I beam.

2. The improvement of claim 1 and further comprising a reinforcement plate (28) interposed between the bottom flange (30) of each I beam and the horizontal wall of the associated saddle bracket; each reinforcement plate being substantially the same length as the centerline spacing of the tandem axles for local reinforcement of the I beam area operatively engaged with the saddle bracket.

* * * * *